US011825169B1

(12) United States Patent
Tiwari et al.

(10) Patent No.: US 11,825,169 B1
(45) Date of Patent: Nov. 21, 2023

(54) ADAPTIVE PLACEMENT OF AUDIOVISUAL CONTENT ON USER DEVICES

(71) Applicants: DISH Network Technologies India Private Limited, Bangalore (IN); Sling Media L.L.C., Foster City, CA (US)

(72) Inventors: Vinay Tiwari, Bengaluru (IN); Amith Kumar Ullur Raghavendra, Bangalore (IN); Vignesh Narayanaswamy, Coimatore (IN); Christine Michelle Chu, San Francisco, CA (US); Faizel Rehiman Kalleri, Fremont, CA (US); Madhukar Pulluru, Foster City, CA (US); Yongjoon Oh, Morgan Hill, CA (US)

(73) Assignees: SLING MEDIA L.L.C., Foster City, CA (US); DISH NETWORK TECHNOLOGIES INDIA PRIVATE LIMITED, Bangalore (IN)

( * ) Notice: Subject to any disclaimer, the term of this patent is extended or adjusted under 35 U.S.C. 154(b) by 0 days.

(21) Appl. No.: 17/841,279

(22) Filed: Jun. 15, 2022

(51) Int. Cl.
| | |
|---|---|
| G09G 5/00 | (2006.01) |
| H04N 21/4782 | (2011.01) |
| G06N 20/00 | (2019.01) |
| H04N 21/25 | (2011.01) |
| G06F 16/957 | (2019.01) |
| H04N 21/482 | (2011.01) |

(52) U.S. Cl.
CPC ..... *H04N 21/4782* (2013.01); *G06F 16/9577* (2019.01); *G06N 20/00* (2019.01); *H04N 21/251* (2013.01); *H04N 21/482* (2013.01)

(58) Field of Classification Search
CPC ............. H04N 21/4782; H04N 21/251; H04N 21/482; G06F 16/9577; G06N 20/00

USPC ....... 345/156, 173, 167, 179; 706/12, 21, 25
See application file for complete search history.

(56) References Cited

U.S. PATENT DOCUMENTS

| | | | |
|---|---|---|---|
| 11,082,789 B1 * | 8/2021 | Mimilakis | ............... G06F 3/165 |
| 2017/0098236 A1 | 4/2017 | Lee et al. | |
| 2019/0080363 A1 | 3/2019 | Acuna Agost et al. | |
| 2020/0145504 A1 * | 5/2020 | Price | ................... G06F 16/9577 |
| 2020/0250605 A1 * | 8/2020 | Moorthy | ................ G06N 20/00 |

(Continued)

OTHER PUBLICATIONS

International Search Report and Written Opinion for International Application No. PCT/US2023/024744, dated Sep. 28, 2023, 12 pages.

*Primary Examiner* — Thuy N Pardo
(74) *Attorney, Agent, or Firm* — Seed IP Law Group LLP

(57) ABSTRACT

Methods and apparatuses that utilize machine learning techniques to dynamically adjust the placement of secondary content that is displayed across numerous user devices over time are described. The user devices may comprise electronic computing devices, such as a mobile phones and digital televisions. The secondary content may be displayed within open slots of webpages or display screens in response to being selected for display during a real-time bidding process for the open slots. In some cases, in response to a bid request for an open slot within a webpage or display screen, a computer-implemented bid generation system for determining the selection and placement of secondary content may identify the secondary content to be displayed within the open slot, determine a bid amount for the identified secondary content, and transmit a bid response that includes the bid amount and the identified secondary content.

20 Claims, 10 Drawing Sheets

(56) References Cited

U.S. PATENT DOCUMENTS

| | | | |
|---|---|---|---|
| 2020/0250606 A1* | 8/2020 | Moorthy | G06Q 10/06312 |
| 2021/0224858 A1* | 7/2021 | Khoury | G06Q 30/0276 |
| 2022/0100800 A1* | 3/2022 | Georgopoulos | G06N 20/00 |
| 2022/0164538 A1* | 5/2022 | Bornea | G06F 40/30 |
| 2022/0193915 A1* | 6/2022 | Marinkovich | G02B 26/00 |
| 2022/0253426 A1* | 8/2022 | Zhu | G06N 3/044 |
| 2023/0097438 A1* | 3/2023 | Cella | H04L 9/3239 700/248 |
| 2023/0102137 A1* | 3/2023 | Carnahan | G06F 16/903 726/4 |

* cited by examiner

Secondary Content Placement and Bidding System 140

Bid Generation System 230

Perturbation Bid Generator 232

Machine Learning Model Trainer 260

Machine Learning Models 262

Training Data Generator 270

Training Data 272

Machine 244
- Network Interface 245
- Processor 246
- Memory 247
- Disk 248

. . .

Machine 254
- Network Interface 255
- Processor 256
- Memory 257
- Disk 258

FIG. 2

| Content Placement Dimension | # Options | Top <1> | Top <2> | Top <3> |
|---|---|---|---|---|
| Placement Location 381 | 21 | Small Leaderboard (320x50) | Medium Rectangle (300x250) | Large Leaderboard (728x90) |
| Fold Position 382 | 4 | Above | Below | Unknown |
| Sites 383 | 82123 | weather.com | youtube.com | allrecipes.com |
| Geo – Region | 52 | Texas | California | Florida |
| Geo – City 384 | 27248 | Dallas | San Jose | Miami |
| Device Type | 5 | Mobile | PC | Tablet |
| OS Family | 7 | Android | iOS | Windows |
| Hour of Week 385 | 168 | 20 | 21 | 22 |

FIG. 3A

ADAPTIVE PLACEMENT OF AUDIOVISUAL CONTENT ON USER DEVICES

BACKGROUND

A web browser running on a computing device may be used to display a webpage that includes both primary content for the webpage and secondary content that comprises content that has been selected using a real-time bidding process for placement of the secondary content at a location within the webpage. The location may correspond with an available slot or an open slot of the webpage. The primary content may be acquired from a web server hosting the webpage and the secondary content may be acquired from a second server that manages the real-time bidding process for the location within the webpage. The secondary content may be displayed within an open slot of the webpage, which may comprise a reserved fixed-sized region of the webpage, in response to a secondary content provider placing a successful bid (e.g., a bid with the highest value) for the secondary content during the real-time bidding process. Typically, the real-time bidding process for placement of the secondary content within the open slot of the webpage must be performed in less than a fraction of a second and therefore computers must be used for generating and transmitting the bids necessary for determining the secondary content to be displayed within the open slot of the webpage and for transmitting the secondary content to the computing device so that the secondary content may be displayed in near real-time along with the primary content.

BRIEF SUMMARY

Systems and methods for improving the identification and placement of secondary content that is displayed along with primary content across numerous user devices are provided. The primary content may comprise text, images, and/or videos associated with the main content for a webpage, application screen, or display screen. The secondary content may comprise text, images, and/or videos associated with content that has been selected using a real-time bidding process for placement of the secondary content within a location on the displayed webpage or display screen. The secondary content can thus be in the form of advertisements, promotions to purchase goods, offers to engage in other activities or the like. To facilitate the placement of secondary content across the user devices, a secondary content placement and bidding system may utilize computer-implemented artificial intelligence (AI) techniques to optimize the real-time generation of bid responses for the secondary content. The secondary content placement and bidding system may predict when a real-time bid response should be submitted in response to a bid request using one or more machine learning models that have been trained using historical placement patterns that have led to the acquisition of new subscribers for a particular service. Several approaches that utilize machine learning techniques to improve the identification and placement of secondary content that is displayed along with primary content across numerous user devices are provided.

According to some embodiments, the technical benefits of the systems and methods disclosed herein for improving the identification and placement of secondary content that is displayed along with primary content include reducing energy consumption for systems that determine bid responses, reducing the number of transmitted bid responses required to acquire a given number of new subscribers, and increasing the decision making performance of machine learning models thereby reducing energy consumption of computing resources and reducing storage device requirements.

BRIEF DESCRIPTION OF THE SEVERAL VIEWS OF THE DRAWINGS

Like-numbered elements may refer to common components in the different figures.

FIG. 2 depicts one embodiment of a secondary content placement and bidding system.

FIG. 3A depicts one embodiment of a chart including a set of placement patterns.

DETAILED DESCRIPTION

Figure 1:
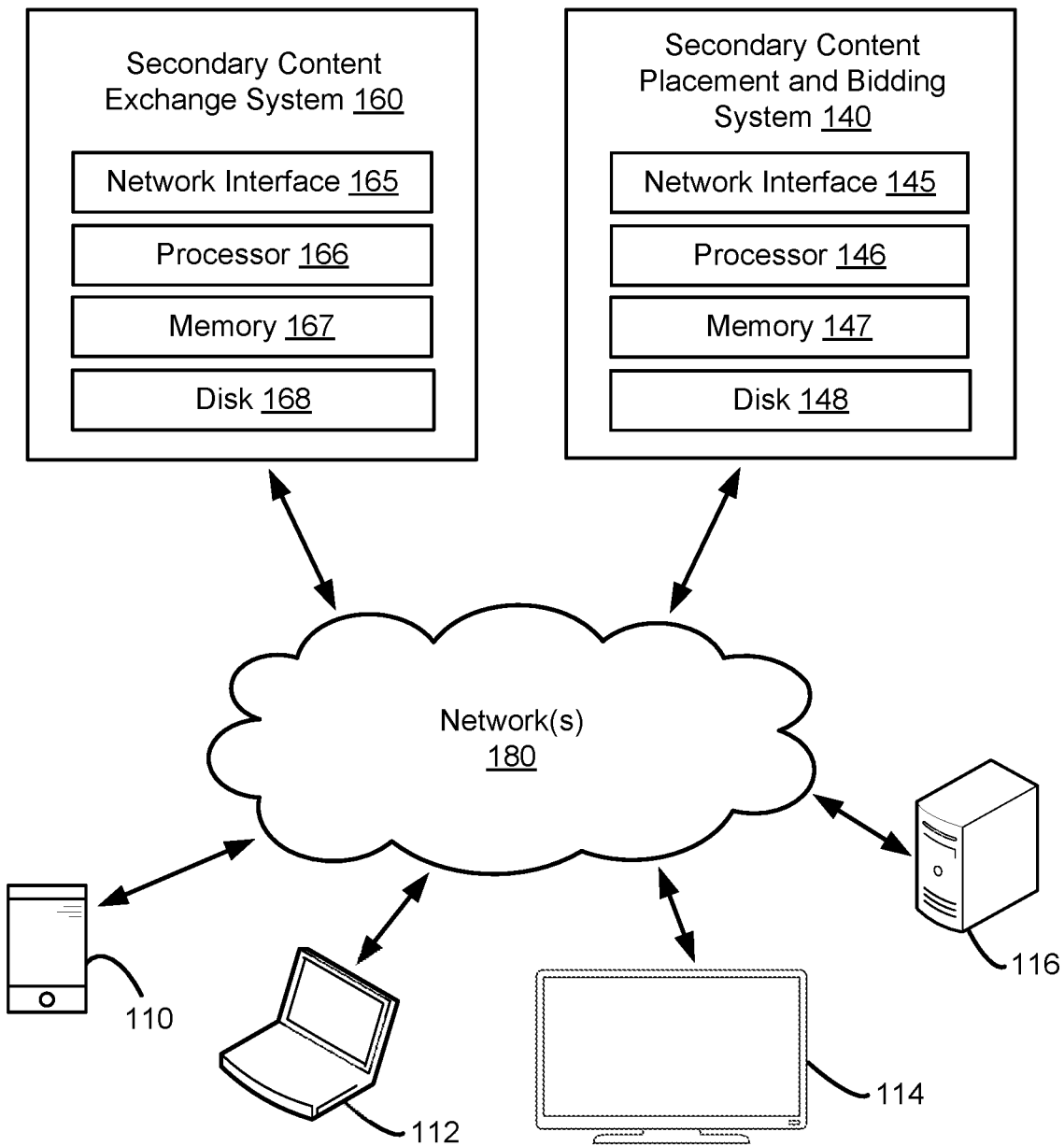
FIG. 1 depicts one embodiment of a networked computing environment.

Technology described herein utilizes machine learning techniques to dynamically adjust the placement of secondary content that is displayed across numerous user devices over time. The user devices may comprise electronic computing devices that include display screens, such as a mobile phone or laptop computer. The secondary content may be displayed within open slots of webpages, application screens, or display screens in response to being selected for display during a real-time bidding process for the open slots. The secondary content may comprise text, images, video, and/or audiovisual content. The secondary content can thus be in the form of advertisements, promotions to purchase goods, offers to engage in other activities or the like. A webpage may be displayed using a web browser running on a user device or within an application running on the user device. A display screen may correspond with viewable content of an end user application installed on a user device. In some cases, in response to a bid request for an open slot within a webpage or display screen, a computer-implemented bid generation system for determining the selection and placement of secondary content within the open slot may identify the secondary content to be displayed within the open slot (e.g., whether a particular image or video would be best suited for the open slot) and a bid amount for the identified secondary content. The bid generation system may then transmit a bid response that includes the bid amount and the identified secondary content to a secondary content exchange system that manages a real-time bidding process for the open slot of the webpage or display screen. The secondary content exchange system may leverage a secondary content distribution system to transmit the identified secondary content to one or more user devices. From the perspective of the secondary content exchange system, the round-trip time for a bid request to be transmitted and a corresponding bid response to be received may be limited to no more than 100 ms.

In order to determine whether the bid generation system should transmit a bid response indicating the secondary content to be placed and the appropriate bid amount, the bid generation system may acquire and consider a size and location of the open slot within the webpage or display screen, the address for the webpage, a size of a display screen on which the identified secondary content would be displayed, a type of computing device on which the identified secondary content would be displayed (e.g., whether the computing device is a mobile phone or laptop computer), a physical location of the computing device on which the identified secondary content would be displayed (e.g., a GPS location for the computing device), an IP address associated with a local network for the computing device or the computing device itself, an email address associated with an end user of the computing device, and/or permitted user-specific information (e.g., the web browsing history, age, and gender of the end user of the computing device). If the bid generation system transmits a bid response to the secondary content exchange system and the bid response includes the highest bid amount received by the secondary content exchange system or a bid of sufficient value, then the secondary content identified within the bid response may be transmitted to the computing device and displayed within the open slot.

In some embodiments, the bid generation system may acquire historical placement patterns and data linking past displays of secondary content on numerous user devices to the acquisition of new subscribers of a particular service (e.g., a streaming television service). The term viewer includes any user that responds to the secondary content, such as by clicking on the content, moving a cursor to hover over the secondary content, moving the location of the primary content in response to the secondary content, or other response.

The broad term buyer includes any user that buys a product or service associated with the secondary content, subscribes to receive a product or service associated with the secondary content, agrees to receive a newsletter or otherwise indicates they wish to receive one or more items corresponding to the secondary content. A placement pattern may correspond with a set of content placement dimensions, such as the location of an open slot within a webpage, a display size of the open slot, whether the open slot is above or below the main content of the webpage, a web address for the webpage, a physical location of the user device displaying the webpage, and a display time for the secondary content (e.g., the hour of the year out of 8760 hours, the hour of the week out of 168 hours, or the hour of the day out of 24 hours during which the secondary content was displayed). Over time, the bid generation system may identify a set of positive placement patterns in which the display of secondary content correlates with the acquisition of new subscribers of the particular service or new purchasers of the product advertised and a set of negative placement patterns in which the display location, size or type of the secondary content did not lead to the acquisition of new subscribers or purchasers of the particular item or service. The bid generation system may store and rank the historical placement patterns (e.g., based on how often a placement pattern was deemed successful in leading to the acquisition of a new subscriber or the average total bid amount required for a placement pattern to lead to the acquisition of a new subscriber). The bid generation system may use the historical placement patterns and their corresponding outcome regarding whether a new subscriber was acquired as labeled training and evaluation data for training one or more machine learning models to determine whether a bid response for secondary content should be generated and transmitted to a secondary content exchange system.

In one embodiment, the bid generation system may train a first machine learning model using a first set of historical placement patterns corresponding with whether secondary content displayed within a first period of time (e.g., within the past month) led to the acquisition of a new subscriber and train a second machine learning model using a second set of historical placement patterns corresponding with whether secondary content displayed within a second period of time greater than the first period of time (e.g., within the year) led to the acquisition of a new subscriber. One technical benefit of utilizing machine learning models covering different time periods is that fewer bid responses may be transmitted to acquire a given number of new subscribers and/or an increased number of new subscribers per a given number of bid responses may be acquired since a longer time period may correspond with a larger and more robust set of labeled training data while a shorter time period may correspond with a smaller set of labeled training data that includes more recent end user behaviors.

In another embodiment, the bid generation system may train a first machine learning model using a first set of historical placement patterns corresponding with whether secondary content displayed within a first geographical region over a first period of time led to the acquisition of new subscribers and train a second machine learning model using a second set of historical placement patterns corresponding with whether secondary content displayed within a second geographical region different from the first geographical region over the first period of time led to the acquisition of new subscribers. One technical benefit of utilizing machine learning models tailored to different geographical regions is that fewer bid responses may be transmitted to acquire a given number of new subscribers within the different geographical regions.

In some cases, the bid generation system may generate perturbation bids for secondary content to be displayed under circumstances that deviate from the set of historically positive placement patterns in order to discover new and improved positive placement patterns. In some cases, a percentage amount of total bid spending or a percentage of the total number of transmitted bid responses within a particular period of time (e.g., 20% of the total number of bid responses within 168 hours) may be allocated to perturbation bids. In one example, the bid generation system may receive a bid request for an open slot within a webpage or display screen and determine using one or more machine learning models that submitting a bid response for the open slot should not be submitted; however, in some cases a bid response may nonetheless be submitted if particular evaluation criteria are satisfied. In one example, the particular evaluation criteria may be satisfied if a web address associated with a bid request comprises a domain that was registered within a past threshold period of time (e.g., within the past year) or more than a threshold amount of the content of the webpage has been altered within the past threshold period of time (e.g., although a domain was registered, more than 95% of the webpage has been updated with new content within the past month). In another example, the particular evaluation criteria may be satisfied if a physical location of a user device displaying the secondary content is within a geographical region that has less than a threshold number of new subscribers (e.g., within a particular city or county, there have been less than 2000 new subscribers within the past month). In another example, the particular evaluation criteria may be satisfied if a confidence value for not submitting a bid response for the open slot is less than a threshold value (e.g., the confidence value for not submitting a bid response for the open slot is less than 50%) and the number of bid responses submitted within a particular period of time (e.g., within the past 24 hours) has been less than a threshold number of bid responses (e.g., the bid generation system has transmitted less than 1000 bid responses within the past 24 hours). One technical benefit of generating perturbation bids for secondary content is that an improved set of labeled training data may be obtained leading to improved machine learning models that escape local minima to find global minimums; the improved machine learning models may lead to improved decision making with fewer bid responses transmitted to acquire a given number of new subscribers thereby reducing energy consumption of computing resources and reducing storage device requirements.

FIG. 1 depicts one embodiment of a networked computing environment 100 in which the disclosed technology may be practiced. Networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include mobile smartphone 110, laptop computing device 112, network-connected digital television 114, hardware server 116, secondary content placement and bidding system 140, and secondary content exchange system 160. In some embodiments, the plurality of computing devices may include other computing devices not shown. In some embodiments, the plurality of computing devices may include more than or less than the number of computing devices depicted in FIG. 1. The one or more networks 180 may include a cellular network, a mobile network, a wireless network, a wired network, a secure network such as an enterprise private network, an unsecure network such as a wireless open network, a local area network (LAN), a wide area network (WAN), the Internet, or a combination of networks. Each network of the one or more networks 180 may include hubs, bridges, routers, switches, and wired transmission media such as a wired network or direct-wired connection.

In some embodiments, computing devices within the networked computing environment 100 may comprise real hardware computing devices or virtual computing devices, such as one or more virtual machines. Networked storage devices within the networked computing environment 100 may comprise real hardware storage devices or virtual storage devices, such as one or more virtual disks. The real hardware storage devices may include non-volatile and volatile storage devices.

Networked computing environment 100 may provide a cloud computing environment for one or more computing devices. Cloud computing may refer to Internet-based computing, wherein shared resources, software, and/or information are provided to the one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The secondary content exchange system 160 may perform real-time bidding processes for placements of secondary content within open slots of webpages (e.g., within a banner location) and display screens (e.g., within a splash screen) displayed using user computing devices, such as mobile smartphone 110, laptop computing device 112, and network-connected digital television 114. The secondary content exchange system 160 may transmit bid requests for placement of secondary content within an open slot of a webpage or display screen to a secondary placement and bidding system 140 and receive bid responses from the secondary placement and bidding system 140. One embodiment of the secondary content exchange system 160 includes a network interface 165, processor 166, memory 167, and disk 168 all in communication with each other. Network interface 165 allows secondary content exchange system 160 to connect to one or more networks 180. Network interface 165 may include a wireless network interface and/or a wired network interface. Processor 166 allows secondary content exchange system 160 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, or Flash). Memory 167 may comprise a hardware storage device or a semiconductor memory.

In some cases, the server 116 may comprise a server within a data center. The data center may include one or more servers, such as server 116, in communication with one or more storage devices. The servers and data storage devices within a data center may be in communication with each other via a networking fabric connecting server data storage units within the data center to each other. In general, a "server" may refer to a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

The secondary placement and bidding system 140 may comprise a network-connected electronic device that generates and transmits bid responses that include bid amounts and identification of secondary content to be displayed to the secondary content exchange system 160. One embodiment of secondary placement and bidding system 140 includes a network interface 145, processor 146, memory 147, and disk 148 all in communication with each other. Network interface 145 allows secondary placement and bidding system 140 to connect to one or more networks 180. Network interface 145 allows secondary placement and bidding system 140 to connect to the secondary content exchange system 160 via the one or more networks 180. Network interface 145 may include a wireless network interface and/or a wired network interface. Processor 146 allows secondary placement and bidding system 140 to execute computer readable instructions stored in memory 147 in order to perform processes discussed herein. Processor 146 may include one or more processing units, such as one or more CPUs and/or one or more GPUs. Memory 147 may comprise one or more types of memory (e.g., RAM, SRAM, DRAM, ROM, EEPROM, or Flash). Memory 147 may comprise a hardware storage device. The processor 146 and memory 147 may be configured to allow secondary placement and bidding system 140 to store, train, and/or deploy machine learning models for determining bid responses.

In some cases, a display of a user computing device, such as a display of mobile smartphone 110, laptop computing device 112, or network-connected digital television 114, may be used to display a webpage that includes both primary content for the webpage and secondary content that comprises content that has been selected using a real-time bidding process for placement of the secondary content within an open slot of the webpage or an overlay on the webpage. The primary content may be acquired from a web server hosting the webpage, such as a web server running on hardware server 116, and the secondary content may be acquired from a second computing device, such as the secondary content exchange system 160 or the secondary content placement and bidding system 140. The secondary content that has been selected during a real-time bidding process may be transmitted to the user computing device in response to a request by an end user of the user computing device to view a particular webpage on the display of the user computing device. Both the primary and secondary content displayed on the display of the user computing device may comprise images, text, videos, and/or audiovisual content. The secondary content may be displayed within an open slot within the particular webpage. The particular webpage hosted by the web server may include one or more open slots that may correspond with one or more impression opportunities.

In some cases, a real-time bidding process may be initiated when an end user of a user computing device requests to view or load the particular webpage causing a web server hosting the particular webpage to transmit the primary content for the webpage to the user computing device. The web server may also acquire permitted user-specific information (e.g., the web browsing history, age, and gender of the end user). The web server may transmit information specifying the size and location of the one or more open slots within the particular webpage and the permitted user-specific information to an intermediary computing device not depicted (e.g., to a supply side platform) that is in communication with the secondary content exchange system 160 that will select the secondary content for display within the one or more open slots of the particular webpage. The secondary content exchange system 160 may transmit bid requests for the one or more open slots to one or more other intermediary computing devices not depicted (e.g., to a demand side platform), along with the information specifying the size and location of the one or more open slots within the particular webpage and the permitted user-specific information for the end user requesting the particular webpage. In response, the one or more other intermediary computing devices may transmit bid responses to the bid requests to the secondary content exchange system 160. The secondary content exchange system 160 may then select the secondary content to be displayed with the particular webpage based on the bid responses (e.g., selecting the secondary content corresponding with the highest bid amount). Subsequently, the secondary content selected by the secondary content exchange system 160 may be transmitted to the user computing device to be displayed along with the main content of the particular webpage.

FIG. 2 depicts one embodiment of the secondary content placement and bidding system 140 in FIG. 1. The secondary content placement and bidding system 140 may utilize one or more machine learning models to determine whether to display secondary content within webpages and display screens and the best locations to place the secondary content within the webpages and display screens. The secondary content placement and bidding system 140 may submit or transmit bid responses for open slots within the webpages and display screens corresponding with desired placement locations for the secondary content. As depicted, the secondary content placement and bidding system 140 includes a bid generation system 230, perturbation bid generator 232, machine learning model trainer 260, machine learning models 262, training data generator 270, and training data 272. The machine learning models 262 may comprise one or more machine learning models that are stored in a memory, such as memory 147 in FIG. 1 or memory 247 in FIG. 2. The one or more machine learning models may be trained, executed, and/or deployed using one or more processors, such as processor 146 in FIG. 1 or processor 246 in FIG. 2. The one or more machine learning models may include neural networks (e.g., deep neural networks), support vector machine models, decision tree-based models, k-nearest neighbor models, Bayesian networks, or other types of models such as linear models and/or non-linear models. A linear model may be specified as a linear combination of input features. A neural network may comprise a feed-forward neural network, recurrent neural network, or a convolutional neural network.

The secondary content placement and bidding system 140 also includes a set of machines including machine 244 and machine 254. In some cases, the set of machines may be grouped together and presented as a single computing system. Each machine of the set of machines may comprise a node in a cluster (e.g., a failover cluster). The cluster may provide computing and memory resources for the secondary content placement and bidding system 140. In one example, instructions and data (e.g., input feature data) may be stored within the memory resources of the cluster and used to facilitate operations and/or functions performed by the computing resources of the cluster. The machine 244 includes a network interface 245, processor 246, memory 247, and disk 248 all in communication with each other. Processor 246 allows machine 244 to execute computer readable instructions stored in memory 247 to perform processes described herein. Disk 248 may include a hard disk drive and/or a solid-state drive. The machine 254 includes a network interface 255, processor 256, memory 257, and disk 258 all in communication with each other. Processor 256 allows machine 254 to execute computer readable instructions stored in memory 257 to perform processes described herein. Disk 258 may include a hard disk drive and/or a solid-state drive. In some cases, disk 258 may include a flash-based SSD or a hybrid HDD/SSD drive.

In one embodiment, the depicted components of the secondary content placement and bidding system 140 includes the bid generation system 230, perturbation bid generator 232, machine learning model trainer 260, machine learning models 262, training data generator 270, and training data 272 may be implemented using the set of machines. In another embodiment, one or more of the depicted components of the secondary content placement and bidding system 140 may be run in the cloud or in a virtualized environment that allows virtual hardware to be created and decoupled from the underlying physical hardware.

The secondary content placement and bidding system 140 may utilize the machine learning model trainer 260, machine learning models 262, training data generator 270, and training data 272 to implement supervised machine learning algorithms. Supervised machine learning may refer to machine learning methods where labeled training data is used to train or generate a machine learning model or set of mapping functions that maps input feature vectors to output predicted answers. The trained machine learning model may then be deployed to map new input feature vectors to predicted answers. Supervised machine learning may be used to solve regression and classification problems. A regression problem is where the output predicted answer comprises a numerical value. Regression algorithms may include linear regression, polynomial regression, and logistic regression algorithms. A classification problem is where the output predicted answer comprises a label (or an identification of a particular class). Classification algorithms may include support vector machine, decision tree, k-nearest neighbor, and random forest algorithms. In some cases, a support vector machine algorithm may determine a hyperplane (or decision boundary) that maximizes the distance between data points for two different classes. The hyperplane may separate the data points for the two different classes and a margin between the hyperplane and a set of nearest data points (or support vectors) may be determined to maximize the distance between the data points for the two different classes.

During a training phase, a machine learning model, such as one of the machine learning models 262, may be trained using the machine learning model trainer 260 to generate predicted answers using a set of labeled training data, such as training data 272. The training data 272 may be stored in a memory, such as memory 147 in FIG. 1 or memory 247 in FIG. 2. In some cases, labeled data may be split into a training data set and an evaluation data set prior to or during the training phase. In some cases, the training data generator 270 may determine the training data set and the evaluation data set to be applied during the training phase. The training data set may correspond with historical data corresponding with a period of time (e.g., over the past year or month).

The machine learning model trainer 260 may implement a machine learning algorithm that uses a training data set from the training data 272 to train the machine learning model and uses the evaluation data set to evaluate the predictive ability of the trained machine learning model. The predictive performance of the trained machine learning model may be determined by comparing predicted answers generated by the trained machine learning model with the target answers in the evaluation data set (or ground truth values). For a linear model, the machine learning algorithm may determine a weight for each input feature to generate a trained machine learning model that can output a predicted answer. In some cases, the machine learning algorithm may include a loss function and an optimization technique. The loss function may quantify the penalty that is incurred when a predicted answer generated by the machine learning model does not equal the appropriate target answer. The optimization technique may seek to minimize the quantified loss. One example of an appropriate optimization technique is online stochastic gradient descent.

The bid generation system 230 may configure one or more machine learning models to implement a machine learning classifier that categorizes input features into one or more classes. The one or more machine learning models may be utilized to perform binary classification (assigning an input feature vector to one of two classes) or multi-class classification (assigning an input feature vector to one of three or more classes). The output of the binary classification may comprise a prediction score that indicates the probability that an input feature vector belongs to a particular class. In some cases, a binary classifier may correspond with a function that may be used to decide whether or not an input feature vector (e.g., a vector of numbers representing the input features) should be assigned to either a first class or a second class. The binary classifier may use a classification algorithm that outputs predictions based on a linear predictor function combining a set of weights with the input feature vector. For example, the classification algorithm may compute the scalar product between the input feature vector and a vector of weights and then assign the input feature vector to the first class if the scalar product exceeds a threshold value.

The number of input features (or input variables) of a labeled data set may be referred to as its dimensionality. In some cases, dimensionality reduction may be used to reduce the number of input features that are used for training a machine learning model. The dimensionality reduction may be performed via feature selection (e.g., reducing the dimensional feature space by selecting a subset of the most relevant features from an original set of input features) and feature extraction (e.g., reducing the dimensional feature space by deriving a new feature subspace from the original set of input features). With feature extraction, new features may be different from the input features of the original set of input features and may retain most of the relevant information from a combination of the original set of input features. In one example, feature selection may be performed using sequential backward selection and unsupervised feature extraction may be performed using principal component analysis.

In some embodiments, the machine learning model trainer 260 may train a first machine learning model with historical training data over a first time period (e.g., the past month) using a first number of input features and may train a second machine learning model with historical training data over a second time period greater than the first period of time (e.g., the past year) using a second number of input features less than the first number of input features. The machine learning model trainer 260 may perform dimensionality reduction to reduce the number of input features from a first number of input features (e.g., 500) to a second number of input features less than the first number of input features (e.g., 100).

The machine learning model trainer 260 may train the first machine learning model using one or more training or learning algorithms. For example, the machine learning model trainer 260 may utilize backwards propagation of errors (or backpropagation) to train a multi-layer neural network. In some cases, the machine learning model trainer 260 may perform supervised training techniques using a set of labeled training data. In other cases, the machine learning model trainer 260 may perform unsupervised training techniques using a set of unlabeled training data. The machine learning model trainer 260 may perform a number of generalization techniques to improve the generalization capability of the machine learning models being trained, such as weight-decay and dropout regularization.

In some embodiments, the training data 272 may include a set of training examples. In one example, each training example of the set of training examples may include an input-output pair, such as a pair comprising an input vector and a target answer (or supervisory signal). In another example, each training example of the set of training examples may include an input vector and a pair of outcomes corresponding with a first decision to perform a first action (e.g., to transmit a bid response) and a second decision to not perform the first action (e.g., to not transmit a bid response). In this case, each outcome of the pair of outcomes may be scored and a positive label may be applied to the higher scoring outcome while a negative label is applied to the lower scoring outcome.

In some cases, the perturbation bid generator 232 may detect that the training data 272 does not include sufficient training examples for a particular web address (e.g., a recently registered web address) or a particular geographic region (e.g., a particular city or county region that has had less than a threshold number of new subscribers for a service within the past month). In response, the perturbation bid generator 232 may generate perturbation bid responses for secondary content to be displayed on user devices operating within the particular geographic region or on user devices displaying a webpage corresponding with the web address. The perturbation bid generator 232 may also randomly submit bid responses in order to maintain that perturbation bid responses are a percentage of a total number of transmitted bid responses within a particular period of time (e.g., that perturbation bid responses comprise 20% of the total number of bid responses within the past 168 hours).

FIG. 3A depicts one embodiment of a chart including a set of placement patterns. Each placement pattern may be associated with a rate of new subscriber acquisitions per the number of bid responses submitted to a content exchange system, such as the secondary content exchange system 160 in FIG. 1. For example, the placement pattern 312 may be associated with a historical rate in the past year of generating 10K new subscriber acquisitions per 500K bid responses submitted to the content exchange system. The first column 302 in the chart provides different content placement dimensions for transmitting bid responses for displaying secondary content within an open slot of a webpage or display screen. The content placement dimensions include the placement location and size of the displayed secondary content within a webpage or display screen, an identification of the location and size of the open slot within the webpage or display screen, whether the open slot is above or below the primary content of the webpage (e.g., the fold position), a web address or URL for the webpage, a physical location of a computing device displaying the secondary content (e.g., the physical location may correspond with a city or region in which the computing device is located), a device type for the computing device displaying the secondary content, and a display time for the secondary content (e.g., the hour of the week out of 168 hours that the secondary content will be displayed within the open slot). The placement location and size of the displayed secondary content within the webpage or display screen may correspond with placement location 381, which may comprise a small or mobile leaderboard that is 320 pixels by 50 pixels. The fold position 382 may correspond with whether an open slot is above or below the primary content of a webpage. The sites 383 may correspond with a web address or URL for a webpage. The geolocation—city 384 may correspond with one of 27,248 different city locations. The hour of the week 385 may correspond with one of 168 hours in a week.

The second column 304 in the chart provides the number of options for each content placement dimension. For example, there are 21 different placement locations, 52 geographic regions, five device types, and 168 hours in a week. The third column 306 in the chart provides the highest ranked placement pattern 312 that has historically generated the highest number of new subscriber acquisitions per the number of bid responses submitted. The specific content placement dimensions for the highest ranked placement pattern 312 may correspond with an input feature vector, wherein each input feature comprises one of the content placement dimensions within the first column 302. The fourth column 308 in the chart provides the second highest ranked placement pattern and the fifth column 310 in the chart provides the third highest ranked placement pattern.

Figure 3B:
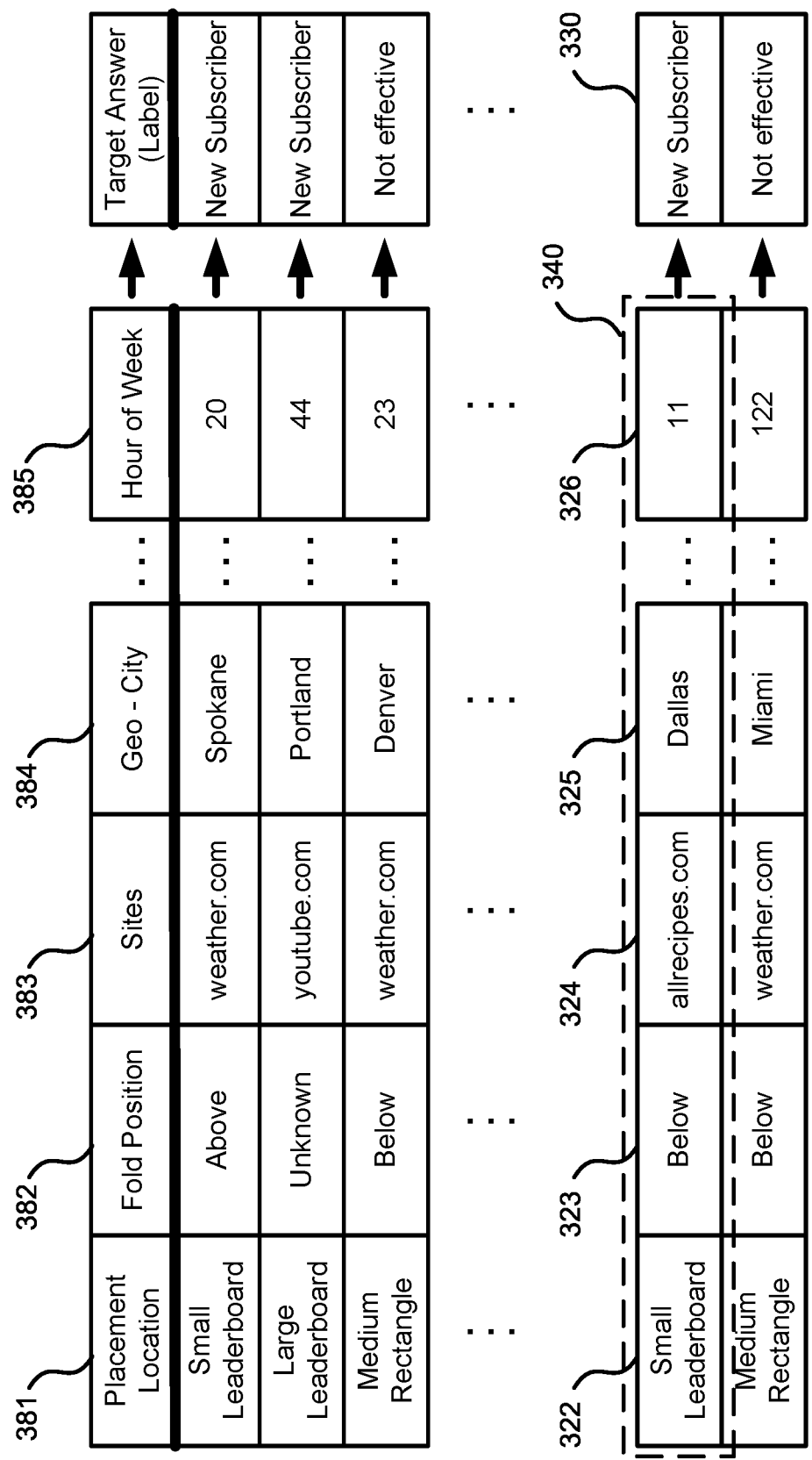
FIG. 3B depicts one embodiment of a set of labeled training data.

FIG. 3B depicts one embodiment of a set of labeled training data. The set of labeled training data may be stored as part of the training data 272 in FIG. 2. Each row may correspond with an input feature vector and an output target answer (or label). For example, input feature vector 340 includes input features 322-326 and the input feature vector 340 maps to a target answer 330. Input feature 322 comprises a small leaderboard open slot location that corresponds with an open slot that is a rectangle shape of 320 pixels by 50 pixels and located at the bottom of a webpage or display screen. Input feature 323 comprises an identification that the open slot is displayed below the main content for a webpage or display screen. Input feature 324 comprises a web address for a webpage. Input feature 325 comprises an identification of a city region. Input feature 326 comprises an hour of a week that the secondary content is displayed. The target answer 330 comprises an identification that the input feature vector 340 maps to a probability that is above a threshold probability that a new subscriber will be acquired. In one example, the threshold probability may be set to 70%.

Figure 3C:
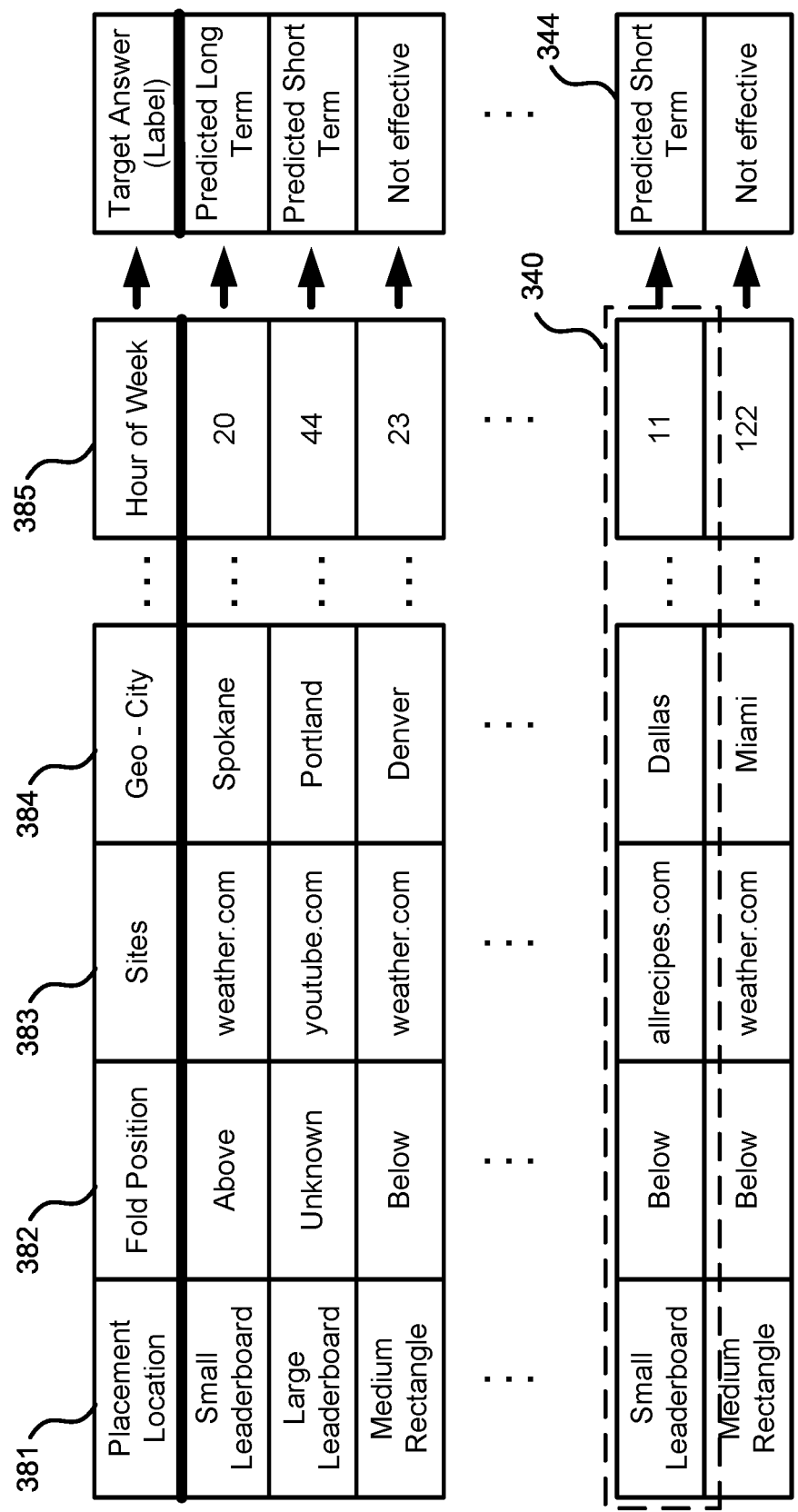
FIG. 3C depicts another embodiment of a set of labeled training data.

FIG. 3C depicts another embodiment of a set of labeled training data. The set of labeled training data may be stored as part of the training data 272 in FIG. 2. Each row may correspond with an input feature vector and an output target answer (or label) that is one of three possible target answers. The three possible target answers comprise an identification that an input feature vector is likely to lead to the acquisition of a new long-term subscriber, is likely to lead to the acquisition of a new short-term subscriber, or is not likely to lead to the acquisition of a new subscriber. As depicted, the input feature vector 340 maps to target answer 344. The target answer 344 comprises an identification that the input feature vector 340 maps to a probability that is above a threshold probability that a new short-term subscriber will be acquired. A new long-term subscriber may comprise a new subscriber that is likely to remain a subscriber for at least one year. A new long-term subscriber may have characteristics such as that a multi-year subscription was entered or that the new subscriber is likely associated with a family signing-up for a family plan subscription. In some embodiments, the bid amount associated with a bid response may be increased (e.g., doubled or tripled) if the predicted outcome for an input feature vector is for a new long-term subscriber to be acquired compared with acquiring a new subscriber that is not likely to remain a subscriber for at least a threshold amount of time (e.g., for at least a year).

Figure 4B:
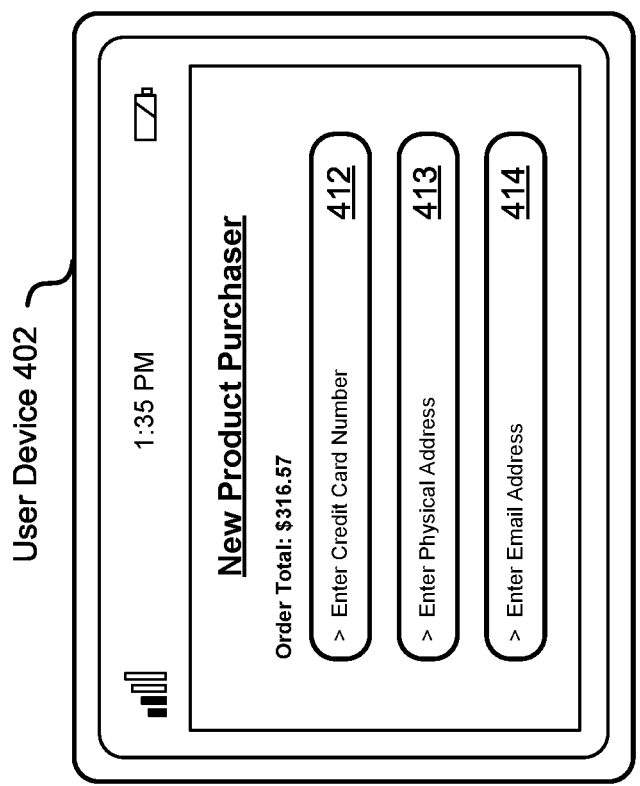
FIG. 4B depicts one embodiment of a user device displaying a webpage or display screen for acquiring new subscribers of a service.
Figure 4A:
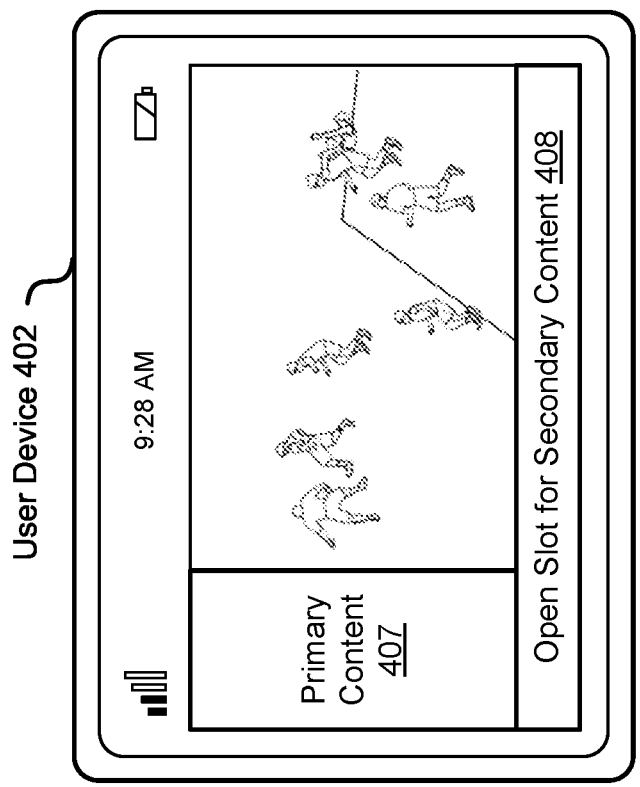
FIG. 4A depicts one embodiment of a user device displaying a portion of a display screen that includes primary content and an open slot for secondary content located at the bottom of the display screen.

FIG. 4A depicts one embodiment of a user device 402 displaying a portion of an display screen that includes primary content 407 located at a left side of the display screen and an open slot for secondary content 408 located at the bottom of the display screen. In one example, the primary content may comprise text not depicted related to the main content for the display screen. The display screen may be provided by an application running on the user device 402, such as a sporting event application and the text related to the main content for the display screen may comprise text related to a sporting event displayed via the sporting event application. In one example, the open slot for secondary content 408 may correspond with a fixed-sized rectangular region at the bottom of the display screen. The user device 402 may correspond with a computing device, such as the laptop computing device 112 in FIG. 1.

FIG. 4B depicts one embodiment of the user device 402 of FIG. 4A displaying a webpage or display screen for acquiring new subscribers of a service or new product buyers. The webpage for acquiring new subscribers of a service or new product buyers may be referred to as a new product purchaser webpage. An end user of the user device 402 may use a web browser running on the user device 402 in order to view the webpage and enter new subscriber information 412-414, such as a physical address for the new subscriber and an email address for the new subscriber. Upon receiving the acquisition of a new subscriber of a service (e.g., a streaming television service), a web server hosting the webpage for acquiring new subscribers of the service may communicate with the secondary content exchange system 160 in FIG. 1 or the secondary content placement and bidding system 140 in FIG. 1 in order to link the new subscriber information 412-414 provided by the end user of the user device 402 with a history of secondary content that was previously displayed on the user device 402. The new subscriber information 412-414 provided by the end user of the user device 402 may be assigned a digital identity (or an anonymized unique alphanumeric identifier) that is transmitted to the secondary content placement and bidding system 140 in FIG. 1 along with the history of the secondary content that was previously displayed on the user device 402.

In some cases, the history of secondary content that was displayed on the user device 402 may be determined by the secondary content exchange system 160 in FIG. 1 or the secondary content placement and bidding system 140 in FIG. 1 via the use of tracking codes, cookie syncing, and/or embedded third-party cookie information. In one example, the history of secondary content that was displayed on the user device 402 may comprise fifty different displays of secondary content within the past six months. In other cases, the history of secondary content that was displayed on user devices within the same geographical region as the user device 402 (e.g., within the same city block or located within a one mile radius of the current location of the user device 402) within a particular time period (e.g., the past six months) may be determined by the secondary content exchange system 160 in FIG. 1 and transmitted to the secondary content placement and bidding system 140 in FIG. 1; in this case, identifying the secondary content that was actually displayed using the user device 402 is not necessary.

The history of secondary content that was displayed on the user device 402 that led to the acquisition of the new subscriber may be used by the secondary content placement and bidding system 140 in FIG. 1 to determine a set of placement patterns that led to the new subscriber acquisition. The set of placement patterns that led to the new subscriber acquisition may be stored as part of the training data 272 in FIG. 2. Numerous sets of placement patterns that led to new subscriber acquisitions may be mined and analyzed to discover high value placement patterns for secondary content that are likely to lead to future new subscriber acquisitions. In one example, one of the placement patterns associated with the display of secondary content on the user device 402 may comprise the placement pattern 312 of FIG. 3A. Another placement pattern associated with the display of secondary content on the user device 402 that led to the new subscriber acquisition may comprise a similar placement pattern as the placement pattern 312 of FIG. 3A, but with a different hour of the week (e.g., hour 34 of the week), a different location and size for the displayed secondary content, and/or a different web address or display screen for the displayed secondary content.

Figure 5A:
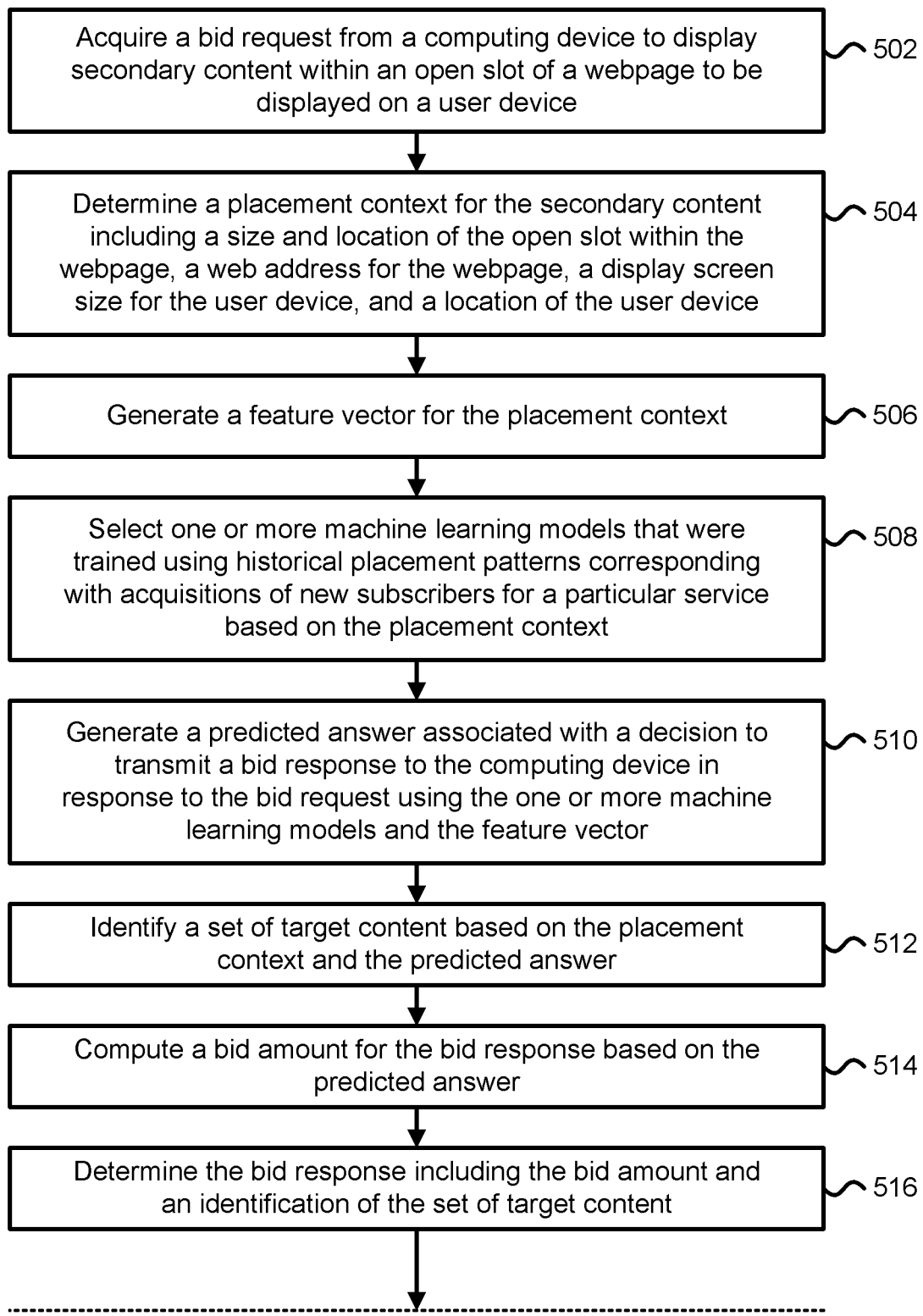
FIGS. 5A-5B depict a flowchart describing one embodiment of a process for selecting the placement of secondary content that is displayed along with primary content on a user device.
Figure 5B:
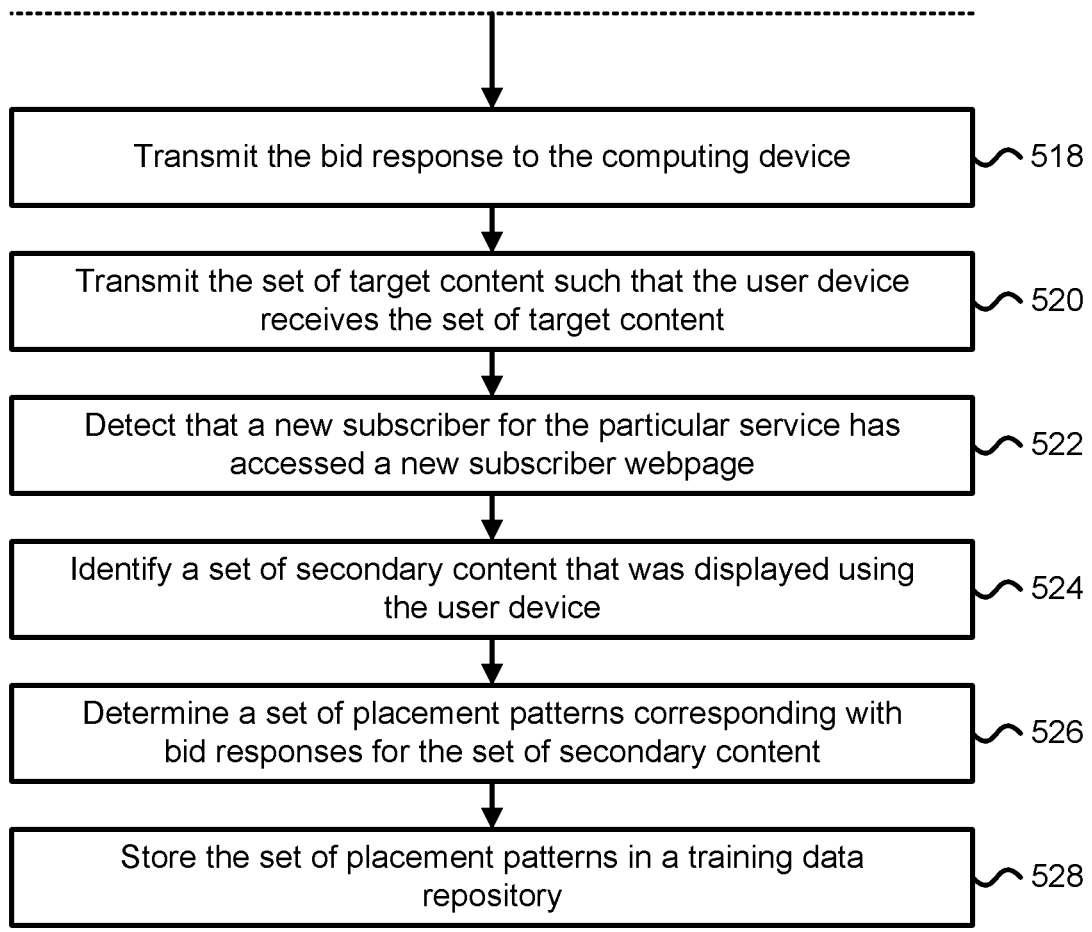

FIGS. 5A-5B depict a flowchart describing one embodiment of a process for selecting the placement of secondary content that is displayed along with primary content on a user device. In one embodiment, the process of FIGS. 5A-5B may be performed by a secondary content placement and bidding system, such as the secondary content placement and bidding system 140 in FIG. 2. In some embodiments, the process or portions of the process of FIGS. 5A-5B may be performed using one or more virtual machines and one or more virtual storage devices.

In step 502, a bid request from a computing device to display secondary content within an open slot of a webpage to be displayed on a user device is acquired. The user device may correspond with a user computing device, such as the mobile smartphone 110 in FIG. 1, the laptop computing device 112 in FIG. 1, or the user device 402 in FIG. 4A. The bid request may be acquired from a secondary content exchange system, such as the secondary content exchange system 160 in FIG. 1. In some cases, the bid request from a secondary content exchange system may comprise a bid request to display secondary content along with primary content to be displayed on the user device. The secondary content may be displayed within an open slot of the webpage or a display screen. In step 504, a placement context for the secondary content is determined. The placement context for the secondary content may include a size and location of the open slot within the webpage, a web address for the webpage, a display screen size for the user device, and/or a location of the user device. In some cases, the placement context may comprise an identification of an application from which the secondary content will be displayed. In step 506, a feature vector for the placement context is generated. In one example, the feature vector may correspond with the input feature vector 340 in FIG. 3C.

In step 508, one or more machine learning models that were trained using historical placement patterns corresponding with acquisitions of new subscribers for a particular service are selected based on the placement context. The one or more machine learning models may be generated or retrained using a machine learning model trainer, such as the machine learning model trainer 260 in FIG. 2. The one or more machine learning models may correspond with the machine learning models 262 in FIG. 2.

In at least one embodiment, the one or more machine learning models may be selected based on a physical location of the user device, a geographical region in which the user device resides, an age of an end user of the user device, and/or a size of a display screen for the user device. In some cases, machine learning models may be trained using historical placement patterns from a particular geographical region (e.g., from the same country, state, or county region).

In step 510, a predicted answer associated with a decision to transmit a bid response to the computing device in response to the bid request is generated using the one or more machine learning models and the feature vector generated in step 506. The feature vector may comprise a set of input variables that are input to the one or more machine learning models to generate the predicted answer or a decision regarding whether to transmit a bid response in response to the bid request. In one example, the predicted answer may comprise a probability value that the bid response should be transmitted to the computing device. If the probability value is greater than a threshold probability value (e.g., is greater than 0.8), then the predicted answer may cause the bid response to be transmitted to the computing device. In another example, the predicted answer may comprise an output label corresponding with the positive action of transmitting the bid response.

In step 512, a set of target content is identified based on the placement context and the predicted answer. The set of target content may comprise text, images, videos, and/or audiovisual content. The set of target content may be selected based on a display size for the user device and a geographical location for the user device. In one example, the set of target content may comprise an image if the display size for the user device is less than a threshold display size; otherwise, the set of target content may comprise a video if the display size for the user device is not less than the threshold display size. The set of target content may be identified in response to detecting that the predicted answer comprises a particular label (e.g., a label associated with transmitting a bid response) or in response to detecting that a probability value corresponding with the predicted answer exceeds a threshold value (e.g., is greater than 0.75).

In step 514, a bid amount for the bid response is computed based on the predicted answer. The bid amount may be a function of a probability value associated with the predicted answer. In this case, a higher likelihood that a bid response should be transmitted may lead to a higher bid amount. The bid amount may be determined based on a display screen size for the user device and/or a location of the user device. The bid amount may be set in order to pace the total bid amounts over a particular time period. For example, the bid amount may be set such that the sum of the bid amounts over an hour does not exceed a threshold value. In step 516, the bid response is determined or generated using a bid generation system, such as the bid generation system 230 in FIG. 2. The bid response may be determined or generated based on the predicted answer. For example, the bid response may be generated in response to detecting that the predicted answer comprises a particular classification or that the predicted answer exceeds a threshold probability value (e.g., is greater than 75%). The generated bid response may include the bid amount and an identification of the set of target content identified in step 512. The bid response may be generated in response to detecting that the predicted answer corresponds with a probability value that is greater than a probability threshold (e.g., is greater than 0.8).

In step 518, the bid response is transmitted to the computing device. In one example, the computing device may correspond with the secondary content exchange system 160 in FIG. 1. In step 520, the set of target content is transmitted such that the user device receives the set of target content. In one example, the set of target content may be transmitted to the secondary content exchange system 160 in FIG. 1 or transmitted to an intermediary server for facilitating content delivery to the user device. In step 522, it is detected that a new subscriber for the particular service has accessed a new subscriber webpage. For example, it may be detected that an end user of the user device has requested to view a new subscriber webpage, such as the new subscriber webpage depicted in FIG. 4B. In step 524, a set of secondary content that was previously displayed using the user device is identified. In some cases, the set of secondary content that was previously displayed on the user device may be acquired from the secondary content exchange system 160 in FIG. 1 or determined via the use of tracking codes, cookie syncing, and embedded third-party cookie information. In one example, the set of secondary content that was displayed on the user device may comprise fifty different displays of secondary content within the past six months. In step 526, a set of placement patterns corresponding with bid responses for the set of secondary content is determined. In step 528, the set of placement patterns is stored in a training data repository. The training data repository may correspond with the training data 272 in FIG. 2. Over time, machine learning models may be generated or retrained on a periodic bases using historical placement patterns stored within the training data repository. In one embodiment, a first machine learning model of the one or more machine learning models may be updated or retrained every 24 hours using historical placement patterns stored within the training data repository.

Figure 5C:
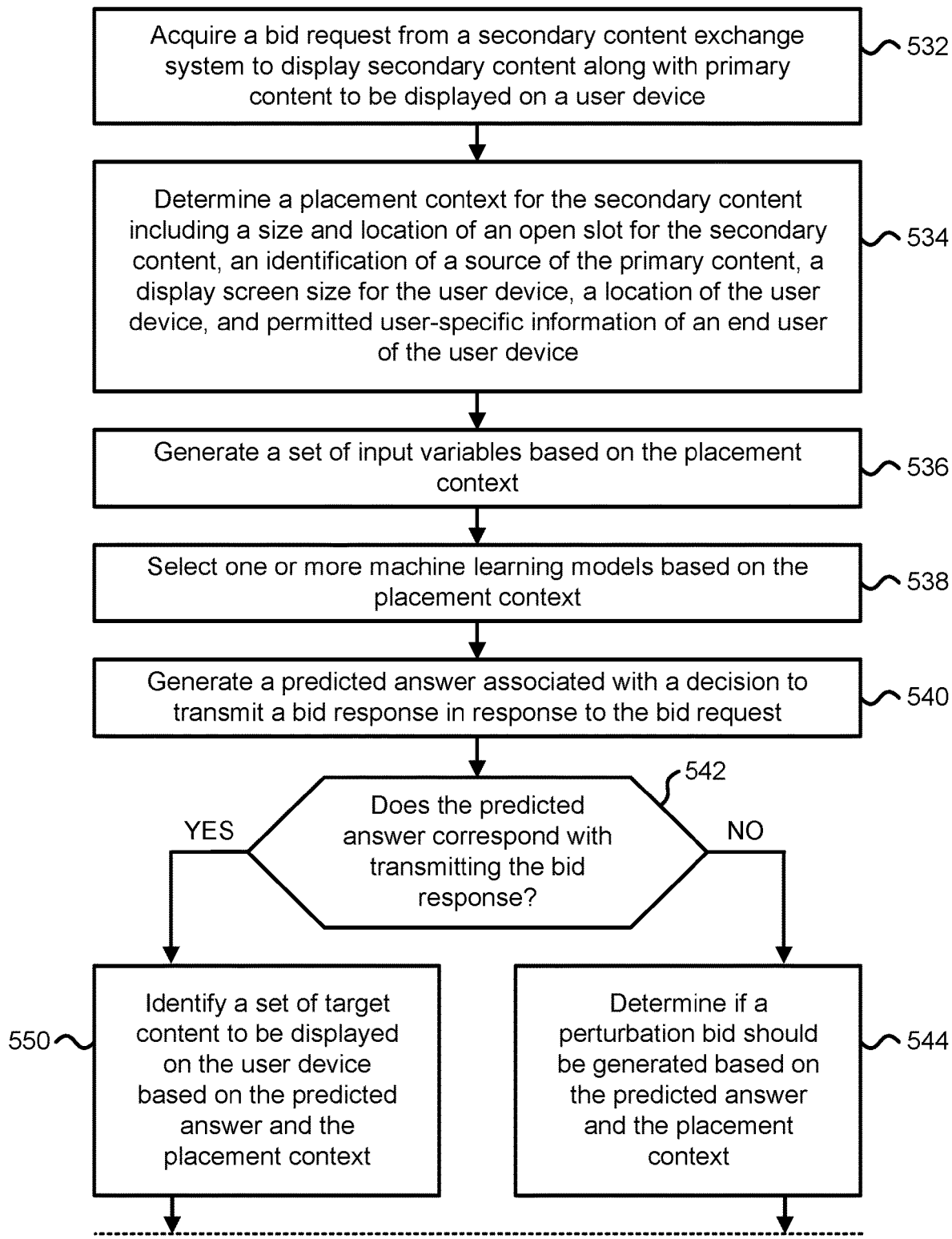
FIGS. 5C-5D depict a flowchart describing another embodiment of a process for selecting the placement of secondary content that is displayed along with primary content on a user device.
Figure 5D:
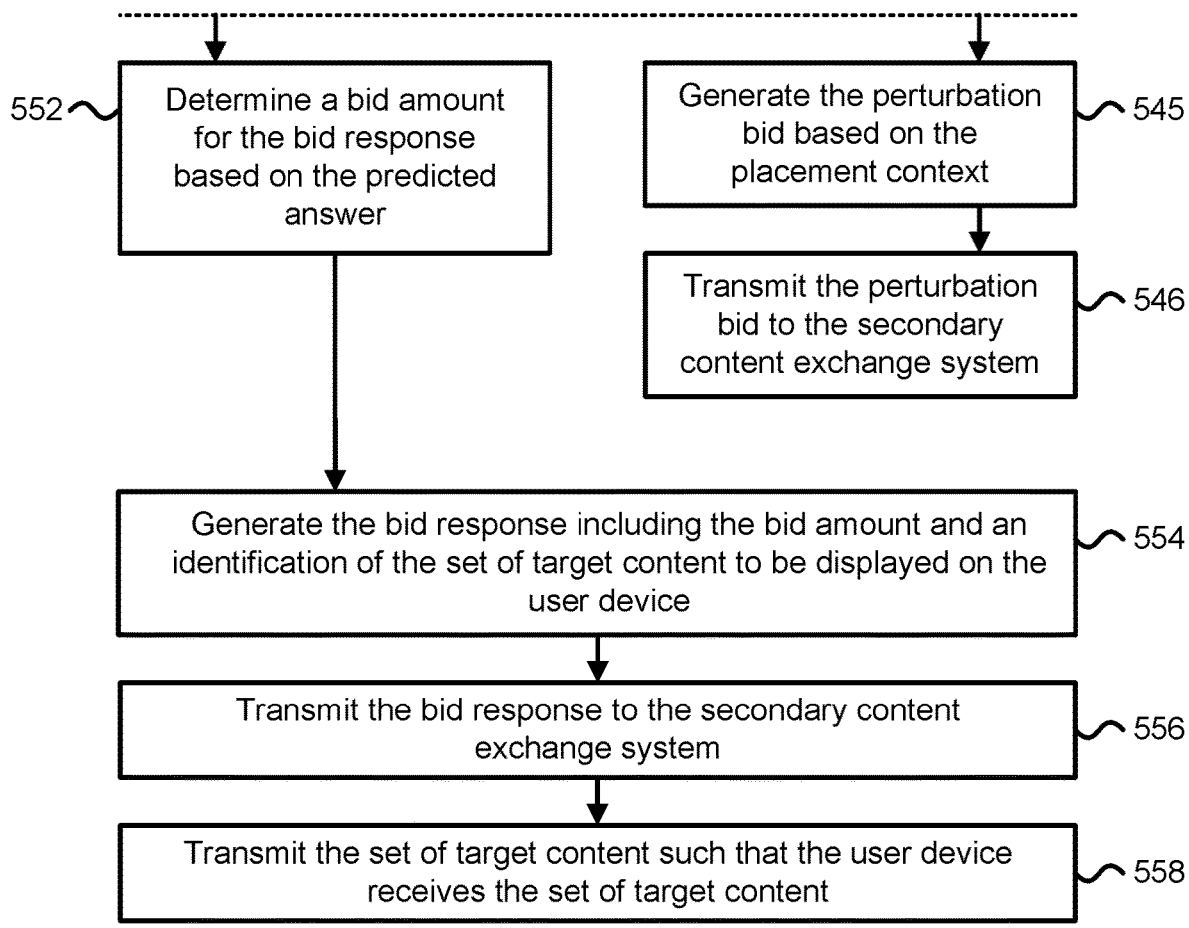

FIGS. 5C-5D depict a flowchart describing another embodiment of a process for selecting the placement of secondary content that is displayed along with primary content on a user device. In one embodiment, the process of FIGS. 5C-5D may be performed by a secondary content placement and bidding system, such as the secondary content placement and bidding system 140 in FIG. 2. In some embodiments, the process or portions of the process of FIGS. 5C-5D may be performed using one or more virtual machines and one or more virtual storage devices.

In step 532, a bid request to display secondary content along with primary content to be displayed on a user device is acquired from a secondary content exchange system. The secondary content exchange system may correspond with the secondary content exchange system 160 in FIG. 1. In step 534, a placement context for the secondary content is determined. The placement context may include a size and location of an open slot for the secondary content within a webpage or an display screen, an identification of a source of the primary content (e.g., an identification of a particular webpage address or URL), a display screen size for the user device, a location of the user device (e.g., a GPS location for the user device), and permitted user-specific information of an end user of the user device (e.g., an age of the end user). In step 536, a set of input variables is generated based on the placement context. The set of input variables may correspond with a feature vector.

In step 538, one or more machine learning models are selected based on the placement context. In one example, a first machine learning model of the one or more machine learning models may be selected based on the age of the end user, the location of the user device, and/or the identification of the source of the primary content. In step 540, a predicted answer associated with a decision to transmit a bid response in response to the bid request is generated using the one or more machine learning models.

In step 542, it is determined whether the predicted answer corresponds with transmitting the bid response. If it is determined that the predicted answer does not correspond with transmitting the bid response, then step 544 is performed. If it is determined that the predicted answer does correspond with transmitting the bid response, then step 550 is performed. In step 544, it is determined if a perturbation bid should be generated based on the predicted answer and the placement context. In step 545, the perturbation bid is generated. The perturbation bid may generated based on the placement context. In one embodiment, the perturbation bid may be generated in response to detection that the secondary content to be displayed on a user device is operating within a particular geographic region or will be displayed on a webpage corresponding with a particular web address. In step 546, the perturbation bid is transmitted to the secondary content exchange system.

In step 550, a set of target content to be displayed on the user device is identified based on the predicted answer and the placement context. In one example, the set of target content may comprise a particular video or image that is identified based on an age of the end user, a location of the user device, and/or a web address or URL associated with the primary content to be displayed on the user device. In response to detecting that the predicted answer corresponds with transmitting the bid response, a secondary content placement and bidding system may select a first image out of a plurality of images associated with possible secondary content to be displayed on the user device based on the placement context for the secondary content.

In step 552, a bid amount for the bid response is determined based on the predicted answer. In step 554, the bid response including the bid amount and an identification of the set of target content to be displayed on the user device is generated. In step 556, the bid response is transmitted to the secondary content exchange system. In step 558, the set of target content is transmitted such that the user device receives the set of target content and displays the set of target content along with primary content using a display of the user device.

At least one embodiment of the disclosed technology includes acquiring a bid request from a computing device to display a set of secondary content within an open slot of a webpage or display screen to be displayed on a user device, determining a placement context for the set of secondary content, generating a feature vector based on the placement context, generating a predicted answer associated with a decision to transmit a bid response to the computing device in response to the bid request using one or more machine learning models and the feature vector, identifying the set of secondary content based on the predicted answer and the placement context, generating the bid response including an identification of the set of secondary content to be displayed within the open slot of the webpage or display screen, transmitting the bid response to the computing device, and transmitting the set of secondary content to the user device.

At least one embodiment of the disclosed technology comprises an electronic device including a storage device (e.g., a semiconductor memory) and one or more processors in communication with the storage device. The storage device configured to store one or more machine learning models. The one or more processors configured to acquire a bid request from a computing device to display a set of secondary content along with primary content to be displayed on a user device, determine a placement context for the set of secondary content, generate a feature vector based on the placement context, generate a predicted answer associated with a decision to transmit a bid response to the computing device in response to the bid request using the one or more machine learning models and the feature vector, determine the bid response based on the predicted answer (e.g., the bid response including an identification of the set of secondary content to be displayed on the user device), and transmit the bid response to the computing device.

At least one embodiment of the disclosed technology includes acquiring a bid request from a computing device to display a set of secondary content within an open slot of a webpage or display screen to be displayed on a user device, determining a placement context for the set of secondary content including a location of the user device, generating a feature vector based on the placement context, generating a predicted answer associated with a decision to transmit a bid response to the computing device in response to the bid request using one or more machine learning models and the feature vector, the one or more machine learning models include a first machine learning model that was trained using a first set of historical placement patterns corresponding with a first period of time and a second machine learning model that was trained using a second set of historical placement patterns corresponding with a second period of time greater than the first period of time. The method further comprising identifying the set of secondary content based on the predicted answer, generating the bid response including an identification of the set of secondary content to be displayed within the open slot of the webpage or display screen, transmitting the bid response to the computing device, and transmitting the set of secondary content such that the set of secondary content is provided to the user device.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each block in a flowchart may correspond with a program module or portion of computer program code, which may comprise one or more computer-executable instructions for implementing the specified functionality. In some implementations, the functionality noted within a block may occur out of the order noted in the figures. For example, two blocks shown in succession may, in fact, be executed substantially concurrently, or the blocks may sometimes be executed in the reverse order, depending upon the functionality involved. In some implementations, the functionality noted within a block may be implemented using hardware, software, or a combination of hardware and software.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a storage device configured to store one or more machine learning models; and
one or more processors in communication with the storage device configured to:
acquire a bid request from a computing device to display a set of secondary content along with primary content on a user device;
determine a placement context for the set of secondary content to be displayed on the user device;
generate a feature vector based on the placement context;
generate, using the one or more machine learning models and the feature vector, a predicted answer associated with a decision to transmit a bid response to the computing device in response to the bid request;
determine the bid response based on the predicted answer, the bid response including an identification of the set of secondary content to be displayed on the user device; and
transmit the bid response to the computing device.

2. The system of claim 1, wherein:
the one or more machine learning models include a first machine learning model that was trained using a first set of historical placement patterns corresponding with a first period of time and a second machine learning model that was trained using a second set of historical placement patterns corresponding with a second period of time greater than the first period of time.

3. The system of claim 1, wherein:
the one or more machine learning models include a first machine learning model that was trained using a first set of historical placement patterns corresponding with a first geographical region and a second machine learning model that was trained using a second set of historical placement patterns corresponding with a second geographical region different from the first geographical region.

4. The system of claim 1, wherein:
the placement context includes a location of an open slot within a webpage or display screen that the set of secondary content will be displayed within on the user device.

5. The system of claim 1, wherein:
the placement context includes a display screen size for the user device.

6. The system of claim 1, wherein:
the one or more processors are configured to detect that a new subscriber for a particular service has accessed a new subscriber webpage and determine a set of historical placement patterns corresponding with secondary content that was displayed using the user device prior to detection that the new subscriber for the particular service accessed the new subscriber webpage; and
the one or more processors are configured to store the set of historical placement patterns using a training data repository.

7. The system of claim 6, wherein:
the one or more processors are configured to retrain a first machine learning model of the one or more machine learning models using the set of historical placement patterns stored within the training data repository.

8. A method for the placement of secondary content, comprising:
acquiring a bid request from a computing device to display a set of secondary content within an open slot of a webpage or display screen to be displayed on a user device;
determining a placement context for the set of secondary content to be displayed on the user device;
generating a feature vector based on the placement context;
generating, using one or more machine learning models and the feature vector, a predicted answer associated with a decision to transmit a bid response to the computing device in response to the bid request;
identifying the set of secondary content based on the predicted answer and the placement context;
generating the bid response including an identification of the set of secondary content to be displayed within the open slot of the webpage or display screen;
transmitting the bid response to the computing device; and
transmitting the set of secondary content to the user device.

9. The method of claim 8, further comprising:
detecting that a new subscriber for a particular service has accessed a new subscriber webpage;
determining a set of historical placement patterns corresponding with secondary content that was displayed using the user device prior to the detecting that the new subscriber for the particular service has accessed the new subscriber webpage; and
storing the set of historical placement patterns in a training data repository.

10. The method of claim 9, further comprising:
retraining a first machine learning model of the one or more machine learning models using the set of historical placement patterns stored within the training data repository.

11. The method of claim 8, wherein:
the placement context includes a size and location of the open slot within the webpage or display screen.

12. The method of claim 8, wherein:
13the placement context includes a display screen size for the user device and a location of the user device.

13. The method of claim 8, further comprising:
determining a bid amount for the bid response based on the predicted answer; and
generating the bid response including the bid amount and the identification of the set of secondary content to be displayed within the open slot of the webpage or display screen.

14. The method of claim 8, wherein:
the one or more machine learning models include a first machine learning model that was trained using a first set of historical placement patterns corresponding with a first period of time and a second machine learning model that was trained using a second set of historical placement patterns corresponding with a second period of time greater than the first period of time.

15. The method of claim 8, wherein:
the one or more machine learning models include a first machine learning model that was trained using a first set of historical placement patterns corresponding with whether secondary content displayed over a first period of time led to an acquisition of a new subscriber and a second machine learning model that was trained using a second set of historical placement patterns corresponding with whether secondary content displayed over a second period of time greater than the first period of time led to the acquisition of the new subscriber.

16. The method of claim 8, wherein:
the one or more machine learning models include a first machine learning model that was trained using a first set of historical placement patterns corresponding with a first geographical region and a second machine learning model that was trained using a second set of historical placement patterns corresponding with a second geographical region different from the first geographical region.

17. The method of claim 8, further comprising:
detecting that a perturbation bid should be generated based on the placement context; and
transmitting the perturbation bid to the computing device.

18. The method of claim 17, wherein:
the detecting that the perturbation bid should be generated includes detecting that a location of the user device is within a particular geographical region.

19. One or more storage devices containing processor readable code for configuring one or more processors to perform a method for the placement of secondary content, wherein the processor readable code configures the one or more processors to:
acquire a bid request from a computing device to display a set of secondary content within an open slot of a webpage or display screen to be displayed on a user device;
determine a placement context for the set of secondary content including a physical location of the user device;
generate a feature vector comprising a set of input variables selected from the placement context;
generate a predicted answer associated with a decision to transmit a bid response to the computing device in response to the bid request, wherein the predicted answer is generated using one or more machine learning models and the input variable from the feature vector, the one or more machine learning models include a first machine learning model that was trained using a first set of historical placement patterns corresponding with a first period of time and a second machine learning model that was trained using a second set of historical placement patterns corresponding with a second period of time greater than the first period of time;
identify the set of secondary content based on the predicted answer;
generate the bid response including an identification of the set of secondary content to be displayed within the open slot of the webpage or display screen;
transmit the bid response to the computing device; and
transmit the set of secondary content such that the set of secondary content is provided to the user device.

20. The one or more storage devices of claim 19, wherein:
the placement context includes a display screen size for the user device.

* * * * *